No. 780,516. PATENTED JAN. 24, 1905.
Z. B. & S. G. MEAD.
MACHINE FOR CLEANING CARPETS, RUGS, OR SIMILAR ARTICLES.
APPLICATION FILED AUG. 20, 1900.
6 SHEETS—SHEET 2.
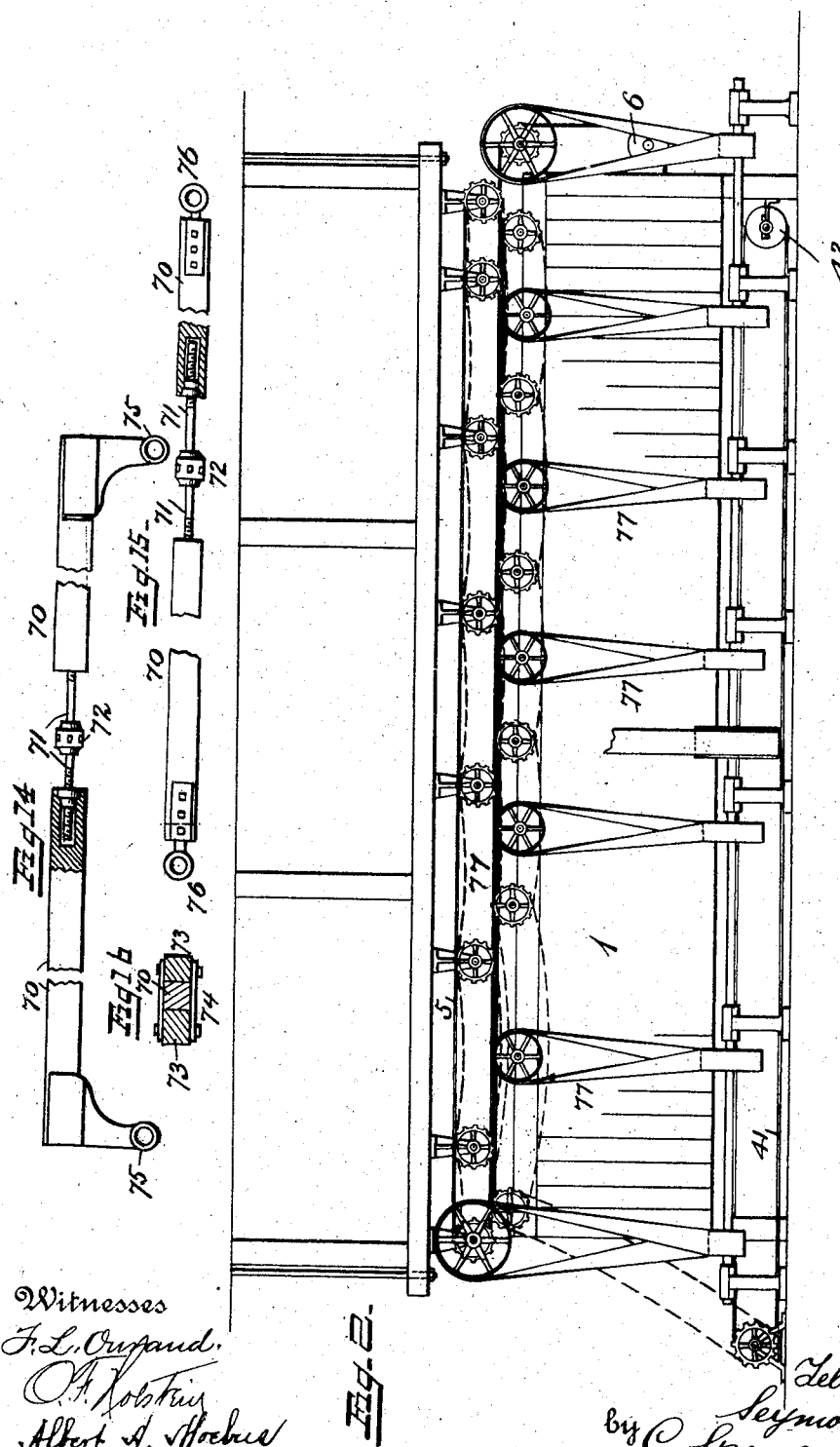

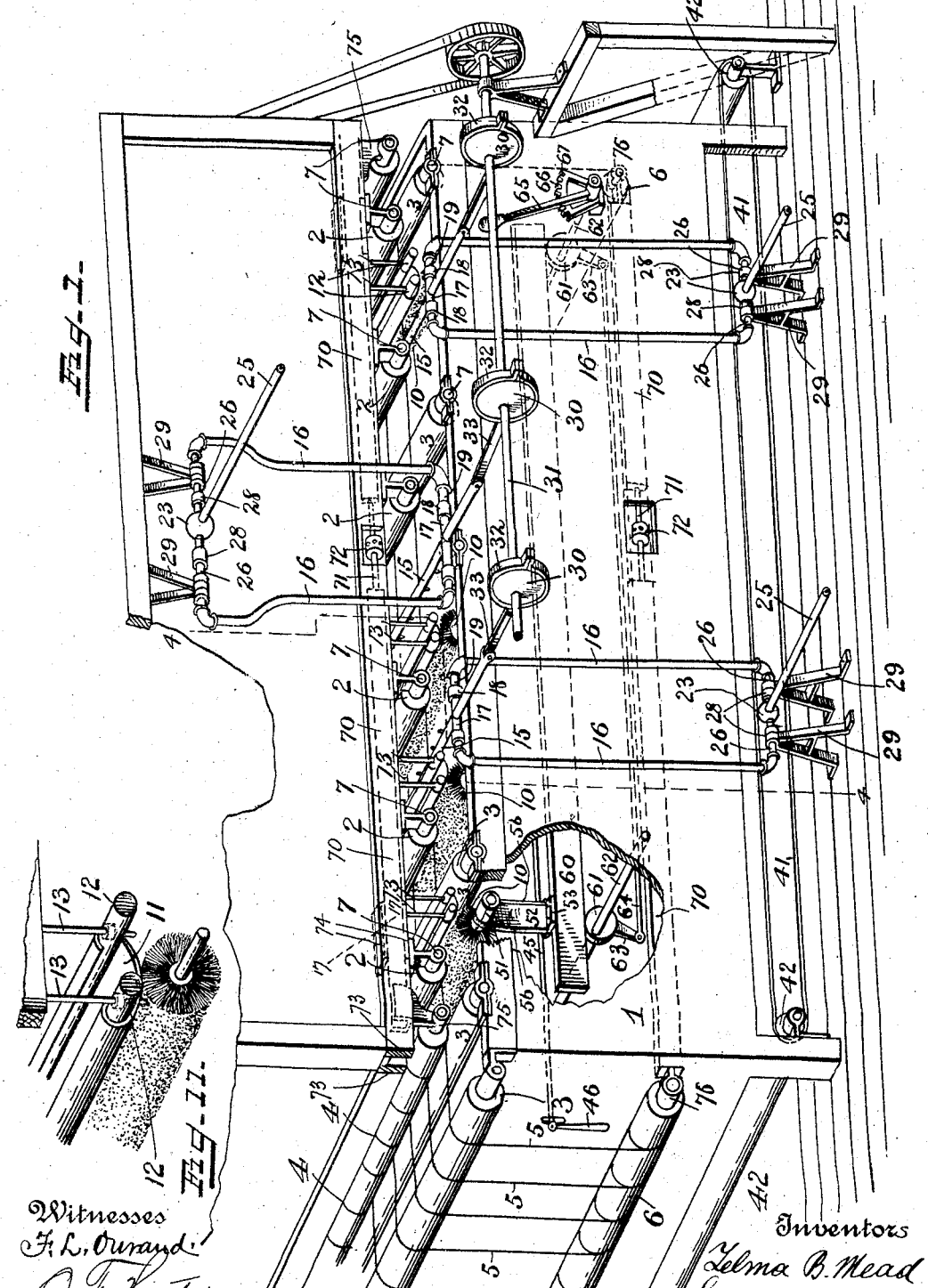

No. 780,516. PATENTED JAN. 24, 1905.
Z. B. & S. G. MEAD.
MACHINE FOR CLEANING CARPETS, RUGS, OR SIMILAR ARTICLES.
APPLICATION FILED AUG. 20, 1900.
6 SHEETS—SHEET 3.
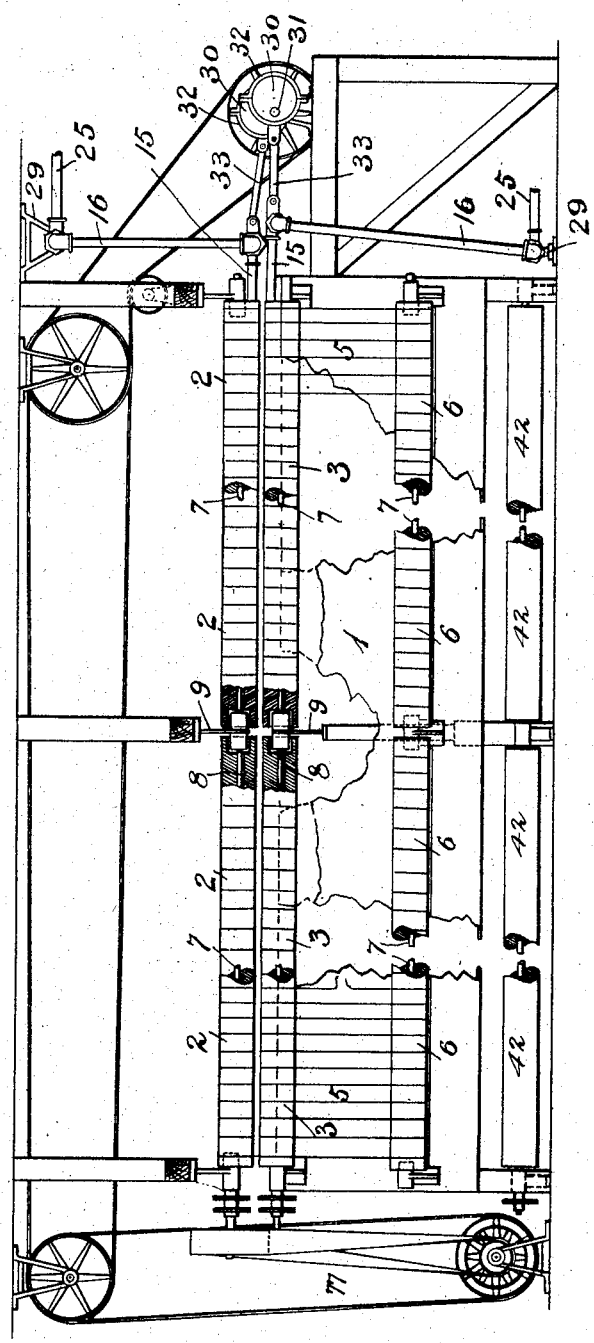

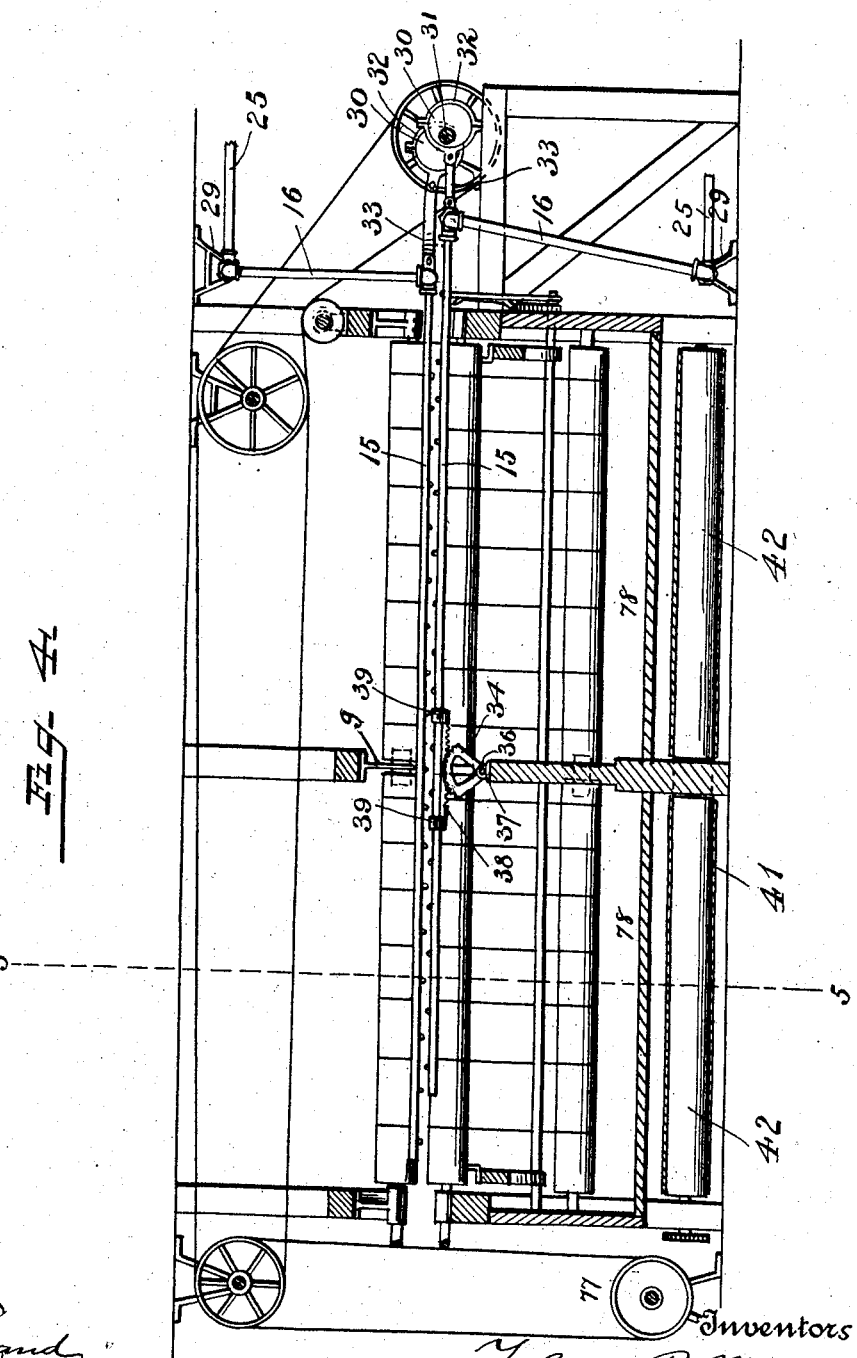

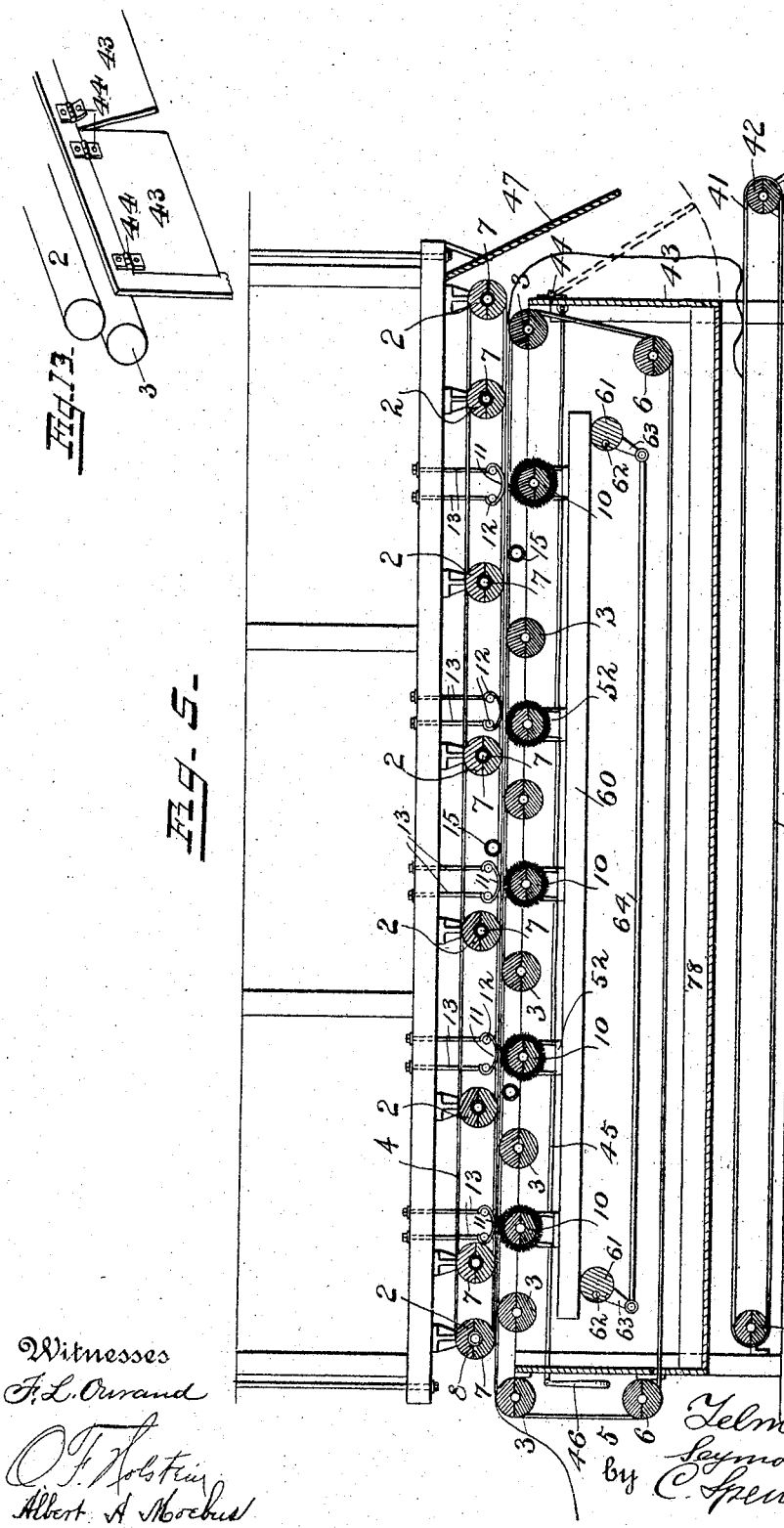

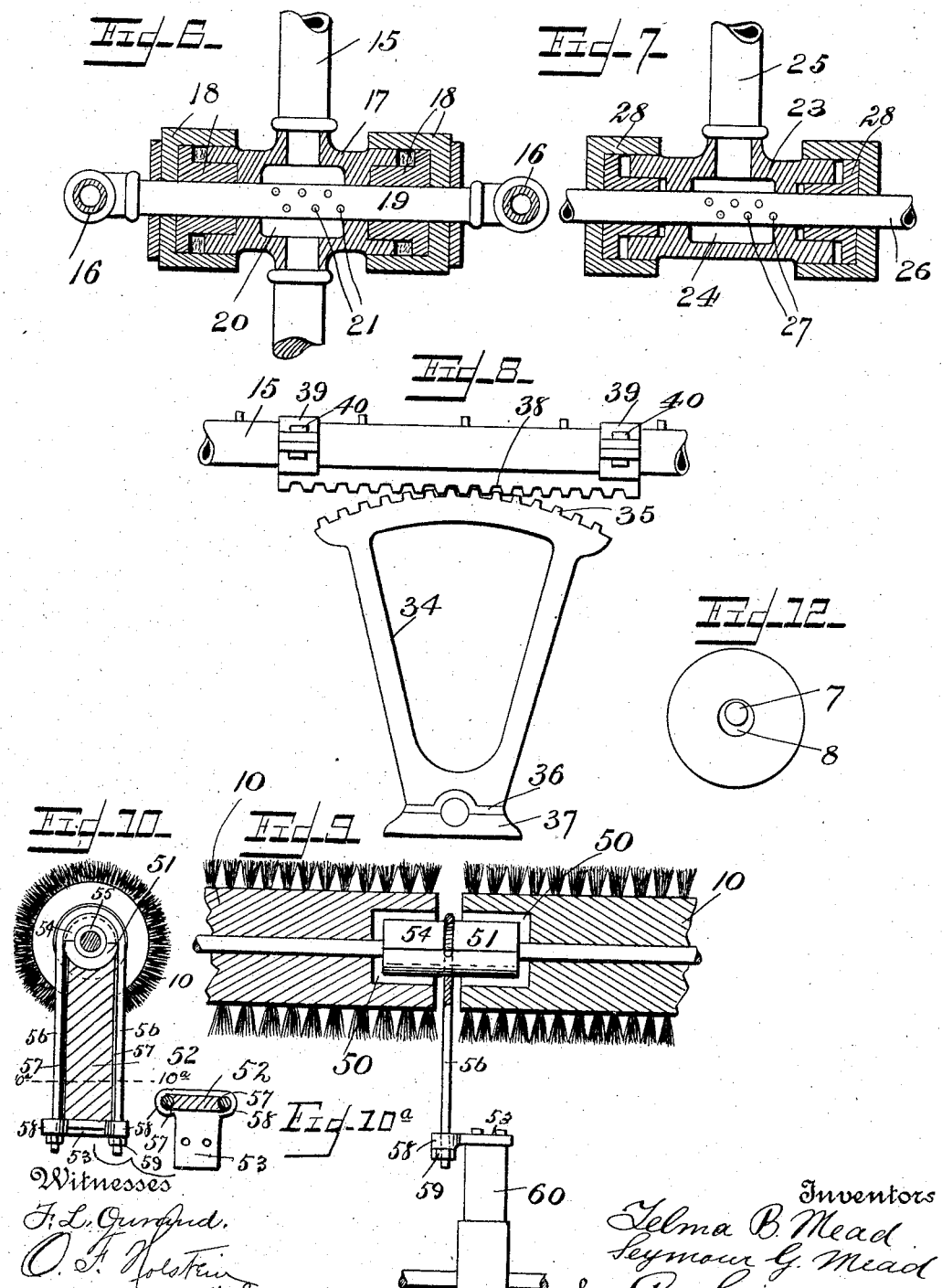

No. 780,516. Patented January 24, 1905.

UNITED STATES PATENT OFFICE.

ZELMA B. MEAD AND SEYMOUR G. MEAD, OF CINCINNATI, OHIO, ASSIGNORS, BY MESNE ASSIGNMENTS, TO THE AMERICAN PNEUMATIC CARPET CLEANING COMPANY, OF CINCINNATI, OHIO, A CORPORATION OF OHIO.

MACHINE FOR CLEANING CARPETS, RUGS, OR SIMILAR ARTICLES.

SPECIFICATION forming part of Letters Patent No. 780,516, dated January 24, 1905.

Application filed August 20, 1900. Serial No. 27,415.

*To all whom it may concern:*

Be it known that we, ZELMA B. MEAD and SEYMOUR G. MEAD, citizens of the United States, and residents of the city of Cincinnati, in the county of Hamilton and State of Ohio, have invented certain new and useful Improvements in Machines for Cleaning Carpets, Rugs, or Similar Articles, of which the following is a specification.

This invention relates to means for cleaning carpets, rugs, and other textile and flexible fabrics; and it consists in certain peculiarities in the construction and arrangement of parts and in certain novel combinations of elements, substantially as hereinafter described, and particularly pointed out in the subjoined claims.

The object of the invention is to provide a machine of maximum efficiency for the purpose described, and this object is well accomplished by the construction illustrated in the accompanying drawings, in which—

Figure 1 is a perspective view of a machine constructed in accordance with our invention. Fig. 2 is a side elevation thereof viewed from the side opposite that seen in Fig. 1. Fig. 3 is an elevation of the front end of the machine with the intermediate parts of the front feed-rollers and frame removed to show the similar parts of the feed-rollers immediately rearward thereof, a portion of said rearward roller being in section to disclose the sectional construction thereof and the manner of supporting its sections. Fig. 4 is a transverse vertical section on the line 4 4 of Fig. 1 with the roller and abutment or pan in front of the upper air-discharge tube removed to disclose said tube. Fig. 5 is a vertical longitudinal section on the line 5 5 of Fig. 4. Fig. 6 is an enlarged view showing in detail a box or union for conducting air from the vertical swinging tubes to the air-discharge tube, said box or union being shown in section. Fig. 7 is a detail sectional view of the union through which air is conducted from the supply-pipe into the oscillatory frame. Fig. 8 is an enlarged detail view showing in elevation a desirable means for supporting an air-discharge tube intermediate of its ends. Fig. 9 is a detailed sectional view of two adjacent sections of a brush, showing a means for connecting and supporting the same. Fig. 10 is an elevation of a brush and its said supporting means. Fig. $10^a$ is a section on the line $10^a$ $10^a$ of Fig. 10. Fig. 11, Sheet 1, is a detail perspective view of a portion of the brush and its abutment. Fig. 12 is a detail end view of one of the feed-rollers, showing the relative sizes of the shaft and shaft-opening. Fig. 13 is a detail view in perspective, showing a portion of the rear end of the frame and two guides thereat, said guides being shown in different positions of adjustment thereof. Fig. 14 is a detail view of a means which may be employed to take up slack in the upper conveyer. Fig. 15 is a means which may be employed to take up slack in the lower conveyer, and Fig. 16 is a transverse section through said take-up means and its guides on the lines 17 17, Fig. 1.

The same numerals of reference designate the same parts in the several views.

1 designates a supporting-frame, which may be of any suitable construction and size. Arranged at intervals along the length of the frame are upper and lower series of feed-rollers 2 and 3. The rollers 2 of the upper series oppose the rollers 3 of the lower series, and between these series of rollers the carpet or other fabric being cleaned is pressed and fed forward from one end to the other of the machine, opposite sides of said fabric being engaged in its passage through the machine by upper and lower series of cords 4 and 5 or other flexible endless conveying means, which travel on their respective series of rollers 2 and 3 and are arranged to hold the said fabric between them and to cause the same to partake of their movement on said rollers. These conveyers are kept in place by traveling in annular guide-grooves in their respective rollers. The lower conveyer-cords 5 in their return from the rear to the front end of the machine preferably pass around rollers 6, which are located at the ends of the frame and below the plane of said rollers 3.

It is desirable that the feeding means automatically accommodate itself to inequalities in the thickness of the article being cleaned and to articles of different thickness. A very simple means by which this desideratum is accomplished is shown and consists in so mounting the upper rollers 2 upon their respective shafts 7 that they will be free to move toward and from the lower rollers 3. This will be clearly seen upon reference to Figs. 3, 5, and 13, in which the shafts 7 are shown as being of less diameter than the openings 8 in the rollers through which they extend.

Located at intervals in the path traversed by the article being cleaned are a series of rotary brushes 10. It is preferred in practice to have the pile or nap side of fabric downward in cleaning the same and to locate the brushes beneath and contiguous thereto, as it is found that this arrangement assists in causing the fabric to be most effectually cleaned. The brushes bear against the fabric in their rotary operation of cleaning it, and in order that they may bear thereon with the requisite pressure and yet not press the same out of the plane in which it properly travels suitable opposing means are located opposite the brushes 10. Said opposing means preferably comprises a series of abutments located across the line of travel of the fabric on the side of the fabric opposite that engaged by the brushes 10 and each comprising a plate 11, which bears upon the upper side of the fabric and is supported by a suitable frame having longitudinal members 12, around which the edges of said plate are folded upward, said members being suitably supported, for example, by the fixed arms 13, depending from the frame 1. This construction while simple and inexpensive efficiently assists the brushes 10 in cleaning the dirt from the fabric and presents no sharp edges liable to injure the fabric. Moreover, in the operation of cleaning the fabric much of the dust or dirt is expelled therefrom into the space above the fabric. It will be apparent that the plates 11 above the fabric are peculiarly adapted to receive and retain much of the dust or dirt which would otherwise resettle onto the fabric. Suitable means may be provided for discharging the dust or dirt from said plates.

The cleaning mechanism of the present machine also comprehends means for discharging air under pressure against the fabric, said means operating to remove the dust raised by the brushes, but not completely removed thereby, and to loosen the dust within the interstices of the fabric where the brush-bristles do not effectually reach, whereby said brushes and air coöperate with each other to clean the fabric efficiently and quickly, each removing some of the dust and dirt and each operating to place under the power of the other dust and dirt which said other would not otherwise efficiently remove. We have shown in the accompanying drawings very desirable construction and arrangement of means for this purpose, which comprise discharge-tubes 15, located above and below the line of feed of the fabric and transverse thereto. These discharge-tubes have their discharge-apertures directed downward and upward against said fabric, respectively. They are reciprocatorily mounted, whereby the streams of air are applied to all parts of the fabric as the same moves through the machine. A very desirable means for supporting and reciprocating each discharge-tube, which means serves also for the supply of air thereto, is shown in the drawings, upon reference to which it will be seen that each air-discharge tube 15 projects from one end of an oscillatory frame comprising tubes 16, through which the air flows to said discharge-tube. At the junction of said frame with the discharge-tube there is located a union or coupling which comprises a sleeve 17, having end stuffing-boxes 18. Through said sleeve and stuffing-boxes passes a tube 19, whose ends are connected to the upper ends of the side members of the frame 16. Said sleeve (see Fig. 6) is formed to provide an interior chamber 20, with which the discharge-tube 15 communicates, and said tube 19, which is of smaller diameter than said chamber, is formed within the latter with apertures 21, through which the air issues into said chamber and thence into and from said discharge-tube 15. The stuffing-boxes obviously prevent leakage of air around the tube 19. At the opposite end of each frame there is a similar union (shown in detail in Fig. 7) comprising a sleeve 23, the interior chamber 24 of which is in communication with the feed-pipe 25, which opens into the same, said chamber also communicating with the side members of the frame 16 through the tube 26, having inlet-apertures 27. The union is also provided with stuffing-boxes 28, which prevent leakage between the ends of said sleeve and said tube. Each of said frames is borne within bearing devices 29, of which those of the lower frames may be secured to the floor of the room which contains the machine and those of the upper frame may depend from the ceiling of said room. It will be observed that the construction described permits said frames to oscillate in said bearings, and thereby feed the discharge-tubes 15 back and forth across the line of travel of the fabric, and it will also be seen that the connection of said frames with the feed-pipes 25 and discharge-tubes 15 is such as to permit said frames to turn relatively to said pipes and tubes, whereby, if desired, said pipes and tubes may be held to move in horizontal planes while the frames oscillate. Said feed-pipes 25 are connected with a suitable source of compressedair supply not necessary to show herein. A means which may desirably be employed to reciprocate said frames 16 comprise eccentrics 30, mounted on a common shaft 31 and connected with their respective frames by straps 32 and pitmen 33.

A desirable number and arrangement of air-discharge means comprises one above and two below the line of feed of the fabric, the former located at or about the center of the machine and the lower ones between said center and the respective ends of the machine.

In machines of large size the air-discharge tubes are long and should have one or more intermediate supports. A desirable construction of such support comprises a rocking or oscillating arc 34, having arcal teeth 35 and supported in a pivotal bearing 36 in the foundation 37, which latter is suitably supported by the frame or otherwise. The teeth of this arc engage teeth of a rack 38 on the under side of the air-discharge tube 15. This rack may be secured to the tube in any suitable manner. A convenient means of securing it consists of slotted clamps 39, drawn together by suitable tightening-screws 40. As the discharge-tube reciprocates this arc oscillates, allowing the said tube to move and at the same time supporting or guiding it and causing it to move in an approximately horizontal plane while its carrying-frame oscillates. Suitable fans suck away the dust raised by the brushes and air-streams from the air-tubes.

It is frequently necessary or desirable to run a carpet or other fabric being cleaned through the machine more than once. To this end a carrier is provided at the bottom of the machine for returning the article to the front thereof. This return-carrier 41 runs on rollers 42, one or both of which are positively driven, and its rear end preferably projects beyond the vertical plane of the rear end of the upper carrier, as shown best in Fig. 5. Means are provided by which the article may be delivered to said return-carrier or not, as desired, said means preferably comprising a series of guide-boards 43, pivotally mounted at their upper ends, as shown at 44, and provided with means by which they may be independently adjusted by the attendant at the front end of the machine. Said adjusting means preferably comprise push-rods 45, (one for each guide-board,) which when pressed rearward turn outward the guide-board connected with it, whereby said guide-board causes the carpet controlled by it to be guided clear of said return-carrier, and when said rod is returned to its outward position said board will be correspondingly returned and will permit the carpet to fall onto said return-carrier to be conducted thereby to the front of the machine. The handle end 46 of each rod 45 is preferably pivoted to the rod so as to be turned downward when the rod is in its forward position, and thereby be out of the way of the attendant and yet accessible to him. Inasmuch as carpets are very heavy, the utilization of a carrier to return them to the front of the machine is obviously a great advantage. The guides are preferably of short lengths and a number of them are preferably employed in each machine, thus adapting them to be readily used with carpets of different widths. Especially is this advantageous when the machine is made, as it usually will be, long enough to take in and clean several carpets at the same time. The short guides will enable the attendant to cause a given carpet to be delivered at the rear onto the carrier or onto the floor without interfering with the other carpets passing through the machine. The attendant is thus enabled to control independently of each other the delivery of the carpets to the floor or to the return-carrier, as desired.

At the rear end of the machine is located a mirror 47, inclined substantially as shown, whereby the operator at the front of the machine can ascertain whether the carpet is obeying the action of the guide or guides. In event that it is not he is thus notified to go to the rear of the machine and adjust the carpet onto the carrier for redelivery to the front of the machine.

As the rollers are of considerable length, it is desirable to form each of the same of a series of sections mounted end to end. This construction most readily adapts the roller to be supported at intervals, which is very desirable and, moreover, enables an injured or worn-out section to be replaced without compelling the entire roller to be replaced. This is especially advantageous with the brush-rollers 10, which are more subject to wear than the feed-rollers, and it will be described in detail in connection with the brushes, although, as shown in Fig. 3, it may and preferably will be employed also in connection with the feed-rollers, the intermediate bearings in the latter rollers being indicated generally by the reference-numeral 9.

Referring to Fig. 9, it will be seen that the contiguous ends of the sections of a brush-roller are formed with recesses 50 for the reception of the bearing 51. This bearing is supported on a thin broad vertical standard 52, (the construction of which is well disclosed in Fig. 1, where it is shown as the support for the end of the brush-roller,) and projects outward at both ends beyond said standard into the respective recesses. Said standard extends between the contiguous ends of said sections and is provided at its bottom with a foot 53, which is secured to the support 60, hereinafter more particularly referred to. The bearing 51 preferably comprises a cylindrical box, having a cap 54, and provided interiorly with Babbitt-metal linings 55, held in place in the usual manner. As an additional securing means for such construction of bearing it is preferred to employ a clamp or stirrup 56, which embraces the bearing and the edges of the standard (and may be seated in recesses 57 in the same) and has its ends extended through openings formed in lugs 58, projecting from the foot 53, said clamp or stirrup being secured by nuts 59. It will be apparent that this construction will enable the sections to run easily and be close together notwithstanding the presence of the bearing and that said bearing also insures steadiness of movement of the brush-shaft.

The support 60, above referred to, preferably comprises bars which extend longitudinally of the machine, each bar supporting a line of brush-bearings. These bars are mounted to have vertical movement, whereby the brushes may be adjusted toward and from the carpet, as desired, in order to bear thereon with the pressure best adapted thereto. A very desirable means for supporting and adjusting said bars comprises eccentrics or cams 61, which are mounted on rods or shafts 62 near the ends of the machine. Said rods or shafts are provided with arms or levers 63, which are connected with each other by a rod or rods 64. Means for operating the eccentrics as combined are supplied, and in the present illustrative instance consist of a lever 65, secured to an eccentric rod or shaft 62 and working on a graduated arc 66, having stops 67, whereby the lever can be set at a desired point along the arc and advance the brushes toward the carpet or retract to a desired degree. In this manner a very perfect adjustment of the brushes to the texture and needs of the carpet is obtained.

The machine preferably is provided with means for taking up slack in the conveyers. One suitable means for this purpose is shown in the drawings and comprises two beams 70, united by a right and left hand screw 71, which works in nuts 72, one of which is fixed in one beam and the other in the other beam, whereby when the screw is turned the beams will be simultaneously adjusted toward and from each other. These beams extend between guides which are suitably fixed to the frame of the machine and comprise longitudinal pieces 73 and cross-pieces 74. Each beam is secured to a bearing of one of the end rollers of the conveying means, (the bearings of the upper rollers being designated 75 and those of the lower rollers 76,) whereby motion communicated to them is transmitted to said bearings.

The operation of the machine may be briefly summarized as follows: Each or several of the feed-rollers and brushes are connected with suitable driving mechanism, such as the chain-gears 77, which are illustrated, but need not be particularly described. An article or articles to be cleaned, such as a carpet or several carpets placed side by side, being inserted by the attendant at the receiving end of the machine between the upper and lower conveying-cords will be tightly gripped by said cords, which are held in proximity to each other by their carrying and feeding rolls and will be positively fed thereby. In its passage through the machine each article will be subjected to the action of the rotary brushes, which have been previously set to give the pressure desired, and to the currents of air from the reciprocating air-tubes, which brushes and air-currents coöperate with each other, as hereinabove stated, to clean the same. Much of the dust and dirt from the carpet will be caught by the pan-shaped abutments 11 and much will be caught by a platform 78, which is located below the plane of the lower conveyer 3 and above the plane of the return-conveyer 41. If any or all of the articles require further cleaning, the particular guide or guides 43, controlling the exit of the same, is drawn inward, thus permitting said article or articles to fall upon the return-conveyer 41, which carries it to the front of the machine, while the guide or guides controlling those which do not require to be repassed through the machine are adjusted into outwardly-inclined position, so as to guide said article or articles clear of said return-conveyer.

What we claim as new and of our invention, and desire to secure by Letters Patent, is—

1. A fabric-cleaning machine, comprising a plurality of rollers each made in sections located end to end and having recesses in their confronting ends, and means for supporting each of said rollers, comprising a shaft extending through the several sections thereof, standards having shaft-engaging heads projecting in opposite directions therefrom each into the contiguous recess in a section, a bar for supporting a line of said standards, said bar extending from one standard to another of said line, and adjustable means engaging said bar for adjusting the same and the several roller-sections.

2. A fabric-cleaning machine, comprising a plurality of rotary brushes, bearings for the shafts of said brushes, a bar extending from one bearing to another and supporting the same, and an adjustable supporting means for said bar, comprising shafts, cams mounted on said shafts and engaging the under surface of said bar at different places in the length thereof and connected to move in unison, and an actuating-lever for said cams secured to one of said shafts.

3. A fabric-cleaning machine, comprising fabric-conveying mechanism, a plurality of rotary brushes, standards for supporting said brushes, said standards having bearings engaging the shafts of said brushes, and adjustable supporting means for said standards comprising a bar supporting a line of said standards, a shaft below each end of said bar, a cam mounted on each of said shafts and engaging the under surface of said bar, means connecting said cams with each other so as to cause them to operate in unison, an adjusting-lever secured to one of said cam-shafts and means for fixing the parts in adjusted position, comprising a toothed arc to be connected with said lever.

4. In a fabric-cleaning machine, a cleaning mechanism comprising a reciprocatory air-discharge tube, and oscillatory means through which the same is supplied, said oscillatory means comprising a tubular frame having chambered unions at its ends, from one of which said discharge-tube leads, a supply-tube having communication with the chamber of the other of said unions, and means for oscillating said frame.

5. In a fabric-cleaning machine, a cleaning mechanism comprising an air-discharge tube, oscillatory means carrying the same and comprising a tubular frame through which said discharge-tube is supplied, said frame having unions at its opposite ends and apertured members in said unions and said unions having interior chambers with one of which said discharge-tube has communication, stuffing-boxes at the ends of said unions, a supply-pipe communicating with the interior chamber of one of said unions, and means for oscillating said frame.

6. In a machine for cleaning carpets, the combination of an air-discharge tube, a rack having clamps at its ends which embrace said tube and secure the rack removably thereto, means for moving said tube, and an oscillatory arcal pivoted support having teeth engaging those of said rack.

7. In a fabric-cleaning machine, the combination with means for conveying the article from the receiving to the delivery end of the machine, and means for returning said article from the delivery to said receiving end of the machine, of an adjustable guiding means for controlling the delivery of said article to said return-carrier.

8. In a fabric-cleaning machine, the combination of conveying means for advancing the fabric, a return-carrier, hinged guides at the rear end of the machine for controlling the delivery of the fabric to the return-carrier, and means for adjusting said guides from the front end of the machine.

9. In a fabric-cleaning machine, the combination with means for conveying the articles to be cleaned from the receiving to the discharge end of the machine, said conveying means being adapted to carry simultaneously a plurality of articles side by side, of a return-carrier traveling from the discharge end of the machine to the receiving end thereof, and a series of independently-adjustable guiding means located at the discharge end of the machine and serving to control the direction of discharge of said articles.

10. In a fabric-cleaning machine, the combination of main feeding devices for advancing the article to be cleaned, a carrier arranged beneath said main feeding devices, and projecting rearwardly beyond the same, hinged guides at the rear, and rods adapted to operate the guides from the front of the machine, substantially as and for the purposes specified.

11. A fabric-cleaning machine comprising a brush, and an abutment located opposite said brush and holding the fabric against the same, said abutment comprising a plate having rolled edges and a supporting-frame for said plate, having spaced longitudinal members engaged by said rolled edges and fixed rods secured to said longitudinal members and supporting the same, substantially as described.

12. A fabric-cleaning machine, comprising rotary brushes, plates located at intervals across the line of travel of the fabric and in proximity to the upper surface of said fabric and directly opposite said brushes, said plates having upwardly-rolled edges and supporting devices for each of said plates, comprising a pair of spaced rods extending longitudinally of said plates and located within the rolled edges thereof, and means for supporting said rods.

13. In a fabric-cleaning machine, means for supplying air under pressure to the fabrics, comprising an oscillatory frame composed of tubular members, means for delivering air to the interior of the same, and a discharge-pipe carried by said oscillatory frame and receiving air therefrom, substantially as described and for the purposes specified.

14. In a fabric-cleaning machine, means for supplying air under pressure to the fabric, comprising a pivotally-supported frame composed of tubular members and having means through which its tubular members are supplied with compressed air, means for oscillating said frame, a pipe projecting from said frame and pivotally connected therewith, said pipe having a series of discharge-apertures, and guiding or supporting means for said pipe located at a distance from said frame and causing said pipe to move in an approximately straight line during the oscillations of the frame.

15. In a fabric-cleaning machine, means for supplying air under pressure to the fabric, comprising an oscillatory frame composed of tubular members, means for delivering air to the interior of the same, a reciprocatory discharge-pipe having pivotal connection with said frame and having teeth between its ends, and a pivoted toothed support engaging said teeth of the discharge-pipe.

16. In a machine for cleaning fabric, the combination of the upper set of cords, the lower set of cords, a series of rollers for carrying each set arranged to cause the cords in their working place and while operating to feed the fabric to lie in proximity to each other, brushes, air-tubes, oscillating air-tube frames, pivotally connected to the air-tubes, and the eccentrics and communications between the latter and the oscillating air-tube frames, substantially as and for the purposes specified.

ZELMA B. MEAD.
SEYMOUR G. MEAD.

Attest:
SAMUEL A. WEST,
K. SMITH.